US009135318B2

(12) United States Patent
Charlot et al.

(10) Patent No.: US 9,135,318 B2
(45) Date of Patent: Sep. 15, 2015

(54) SYSTEM AND METHOD FOR IMPLEMENTING A 64 BIT DATA SEARCHING AND DELIVERY PORTAL

(71) Applicant: Intelligent Medical Objects, Inc., Chicago, IL (US)

(72) Inventors: Régis J P Charlot, Lake Bluff, IL (US); Frank Naeymi-Rad, Libertyville, IL (US); Aziz M. Bodal, Skokie, IL (US); Matthew C. Cardwell, Oak Park, IL (US); Alina Oganesova, New York, NY (US); Andre L. Young, Kenosha, WI (US); Fred Masarie, Portland, OR (US); David Alvin, Glen Elyn, IL (US); David Haines, Arlington Heights, IL (US); Jose A. Maldonado, Chicago, IL (US); Masayo Kobashi, Long Grove, IL (US)

(73) Assignee: INTELLIGENT MEDICAL OBJECTS, INC., Northbrook, IL (US)

( * ) Notice: Subject to any disclaimer, the term of this patent is extended or adjusted under 35 U.S.C. 154(b) by 179 days.

(21) Appl. No.: 13/971,653

(22) Filed: Aug. 20, 2013

(65) Prior Publication Data

US 2015/0058317 A1    Feb. 26, 2015

(51) Int. Cl.
*G06F 17/30* (2006.01)

(52) U.S. Cl.
CPC ............................... *G06F 17/30554* (2013.01)

(58) Field of Classification Search
CPC ........................................................ G06F 17/30
USPC ................................................ 707/600–899
See application file for complete search history.

(56) References Cited

U.S. PATENT DOCUMENTS

| 2005/0114283 | A1 | 5/2005 | Pearson et al. |
| 2006/0241868 | A1 | 10/2006 | Sun et al. |
| 2008/0040150 | A1 | 2/2008 | Kao |
| 2009/0080408 | A1 | 3/2009 | Natoli et al. |
| 2014/0156668 | A1* | 6/2014 | Dubey et al. ................. 707/741 |

OTHER PUBLICATIONS

IMO Vocabulary Portal User Manual, Jan. 1, 2013, Intelligent Medical Objects, Inc., Northbrook, IL, US.
Written Opinion of the International Searching Authority and International Search Report issued in PCT Application No. PCT/US14/48356, mailed Apr. 6, 2015, 7 pages.

* cited by examiner

*Primary Examiner* — Isaac M Woo
(74) *Attorney, Agent, or Firm* — Quarles & Brady LLP

(57) ABSTRACT

A system and method for searching and presenting data may include receiving a search request, storing data in an in memory database, accessing that data by one or more 64 bit processors, determining exact or approximate matches among the data to the search request, building a machine-readable data file including the search results, and serving the data file to a user's machine, where it is visible through a portal interface, which may be local or remotely served to the user's machine. The system may employ 64 bit technology in order to access and serve significant amounts of information, including mappings between code set and other data that may include mappings to one or more code sets. The system also may employ raw TCP/IP sockets to reduce latency and increase search speed.

22 Claims, 6 Drawing Sheets

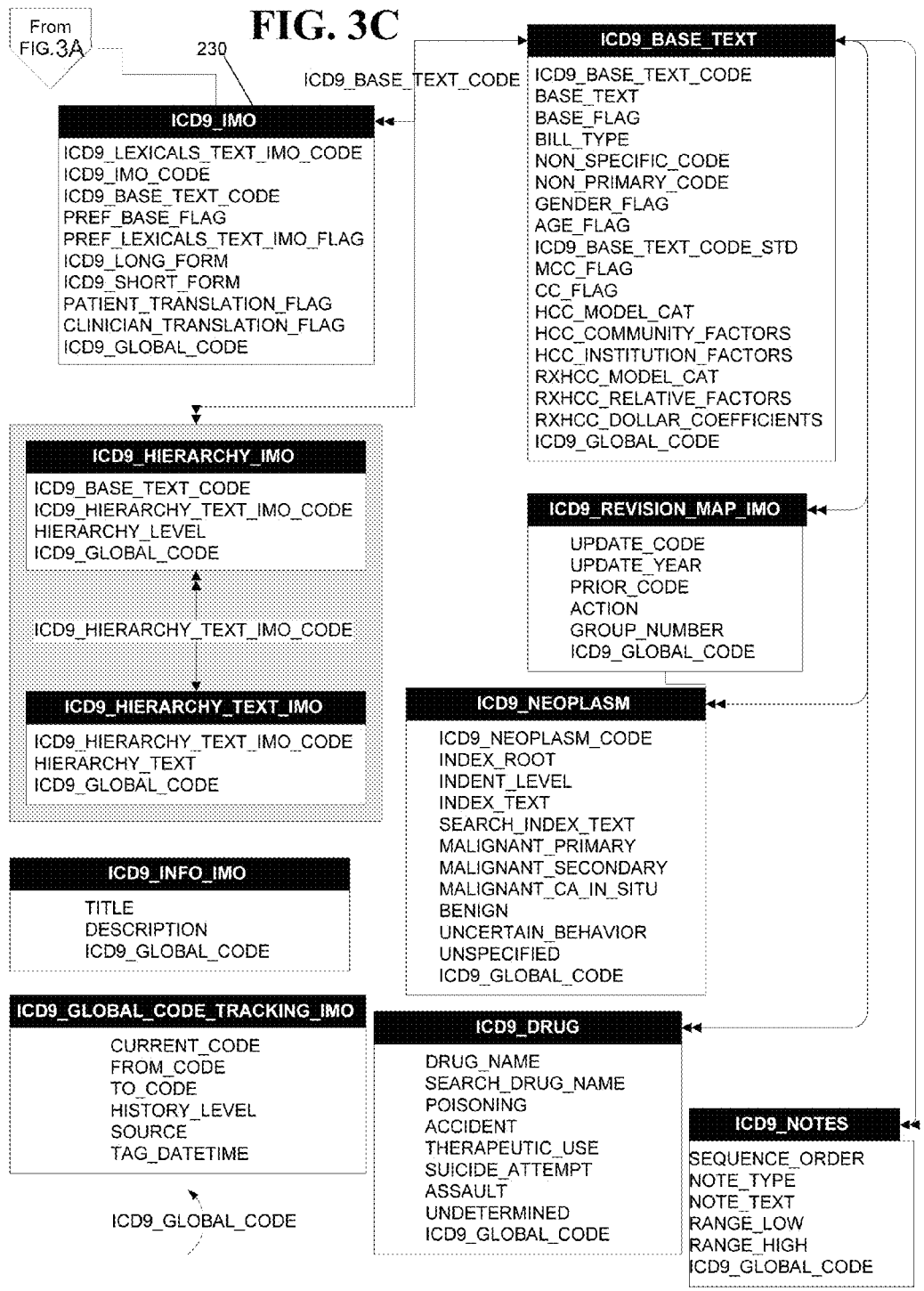

SYSTEM AND METHOD FOR IMPLEMENTING A 64 BIT DATA SEARCHING AND DELIVERY PORTAL

BACKGROUND

Concept based terminology mapping may be incredibly useful when it comes to managing terminology and applying the terminology to multiple aspects of a record system, e.g., an electronic health record system, which may rely upon one or more terminology or code sets for one or more aspects of a business.

Although these terminology mappings undoubtedly are useful, there may be several difficulties in their implementation. For example, problems may arise in the areas of initial implementation, updates, and searchability. One example of an interface terminology mapping method that may address many of these issues and may be useful in managing multiple code sets may be described and claimed in the commonly-owned pending U.S. patent application Ser. No. 13/660,512, titled "Method and System for Concept-Based Terminology Management," the contents of which are incorporated by reference.

In addition, while terminology mapping such as that described in the '512 application may provide an advantageous way of managing terminology, issues may arise in the distribution of the terminology to various entities. For example, there may be difficulties in distributing information to multiple entities that may be contained within a single, interrelated organization—such as doctors and billing departments within a hospital—or that may comprise multiple, independent organizations—such as entities at different, unaffiliated hospitals.

While care providers may benefit from robust and accurate terminology distribution, e.g., by enabling the providers to create and maintain detailed, accurate health records and by facilitating complete, accurate billing, it also may be useful for the care provider to have access to additional information at least tangentially related to the patient's visit. For example, the practitioner may benefit from immediate access to recent studies or courses of treatment relating to the same condition the patient has. The practitioner also may wish to supply the patient with additional information relevant to the patient's visit, and it would be useful to have that information immediately available without requiring an extensive search by the practitioner.

What are needed are a system and method that address the issues presented above.

BRIEF SUMMARY

In one aspect, a method for searching and presenting data may include the steps of: receiving a search query at a computer having a processor; comparing, by the processor, the query against one or more data repositories for data related to the query, wherein the comparing step includes analyzing the query for an exact or approximate match to one or more entries in a code set; and serving one or more exact or approximate matches to a user, where the code set may be stored in a database, and where the processor is a 64 bit processor. Any type of database may be used, although transactions may be particularly fast and receptive to scalability when an in memory database is employed. In addition, the receiving and serving steps may be implemented using a raw TCP/IP socket connection on the computer.

The database also may store a set of mappings between the code set and another code set, and the method may include serving, to the user, mappings corresponding to the one or more or exact or approximate matches. Additionally or alternatively, mappings may be made between concepts in the code set and entries in the other code set. The method further may include the steps of: storing additional data, tagging the data with one or more codes in the code set, identifying data tagged with the one or more exact or approximate matches, and serving at least some of the identified data to the user.

The code set may include at least one domain, a plurality of concepts within the at least one domain, and a plurality of descriptions also within the at least one domain, where a description is an alternative way to express a concept. In that instance, the serving step may include serving descriptions corresponding to the one or more exact or approximate matches.

In another aspect, a system for searching and presenting data may include: a server having one or more processors, wherein each processor has a 64-bit wide register; one or more computer connectivity means on the server that are configured to receive search queries and serve search results; an database storing a code set; and a search service configured to analyze the search queries, compare the search queries against the code set, and serve exact or approximate matches to machines that originated the search queries.

The computer connectivity means may be, e.g., TCP/IP socket connections or Windows Communication Foundation (WCF) connections, and the database may be an in memory database. The search service may be configured to serve results in a machine-readable file format, such as XML or JSON. The system further may include a plurality of servers configured to receive search queries and return search results, wherein each server preferably is connected in a load balancing relationship with the other servers, e.g., being accessed by being the closest located (either locally or globally) to the system or user making the request.

In addition, the database may store mappings between the code set and another code set. The code set may include at least one domain, a plurality of concepts within the at least one domain, and a plurality of descriptions also within the at least one domain, where a description is an alternative way to express a concept. In that case, mappings may be made between concepts in the code set and entries in the other code set.

The database may be configured to store additional data, which may be tagged with one or more codes in the code set. The system then may be configured, in response to a search request, to identify data tagged with the one or more exact or approximate matches and to serve at least some of the identified data to the user.

These and other features and advantages are described in the following description, with reference to the accompanying drawings.

BRIEF DESCRIPTION OF THE SEVERAL VIEWS OF THE DRAWINGS

FIGS. 3A-3C are a database entity relationship diagram illustrating one example of interface terminology including an external code set.

DETAILED DESCRIPTION

A system and method for the hosting, distribution, and or cross-mapping of data to multiple recipients across multiple computer systems in response to queries received from the recipients. In one aspect, the data may include terminology-related data, particularly terminology-related data used across multiple aspects of a healthcare provider.

Initially, it may be desirable to create a data repository for use with the system. In one embodiment, the repository may comprise a set of code set mappings. Additionally, it may be desirable to import files or other data that can be mapped to one or more of the code sets, with the desired goal of serving all of that data to clients.

The data repository also may include a plurality of links to one or more documents, images, or other files accessible by the system, as well as a repository of mappings of code set elements to the files. Linking may be internal or external, i.e., to files stored and hosted by system computers, or to files stored on third party or other external computers. Files, particularly the latter files, may be accessible via http, https, or other Internet connections. Not all files may be accessible publicly, but instead some files such as academic publications or journal articles may be available from third party providers on a subscription basis.

A terminology schema may organize terminology-related data across multiple levels. In one aspect, a Clinical Interface Terminology (CIT) suite of vocabulary products may help people manage their health information by providing robust, user-friendly vocabularies that contain user-specific and familiar words and phrases, allowing clinicians, information management professionals, and patients alike to find and record the terms they need quickly and easily.

The mappings from CIT to standardized vocabularies such as MeSH, UMLS and SNOMED® CT may help to connect providers and patients easily with relevant patient record, administrative information, academic references, and consumer information.

Most importantly, a CIT may permit health care organizations and software developers to focus on the work that they need to do and not worry about creating, maintaining, and implementing their own health data dictionaries.

Figure 1:
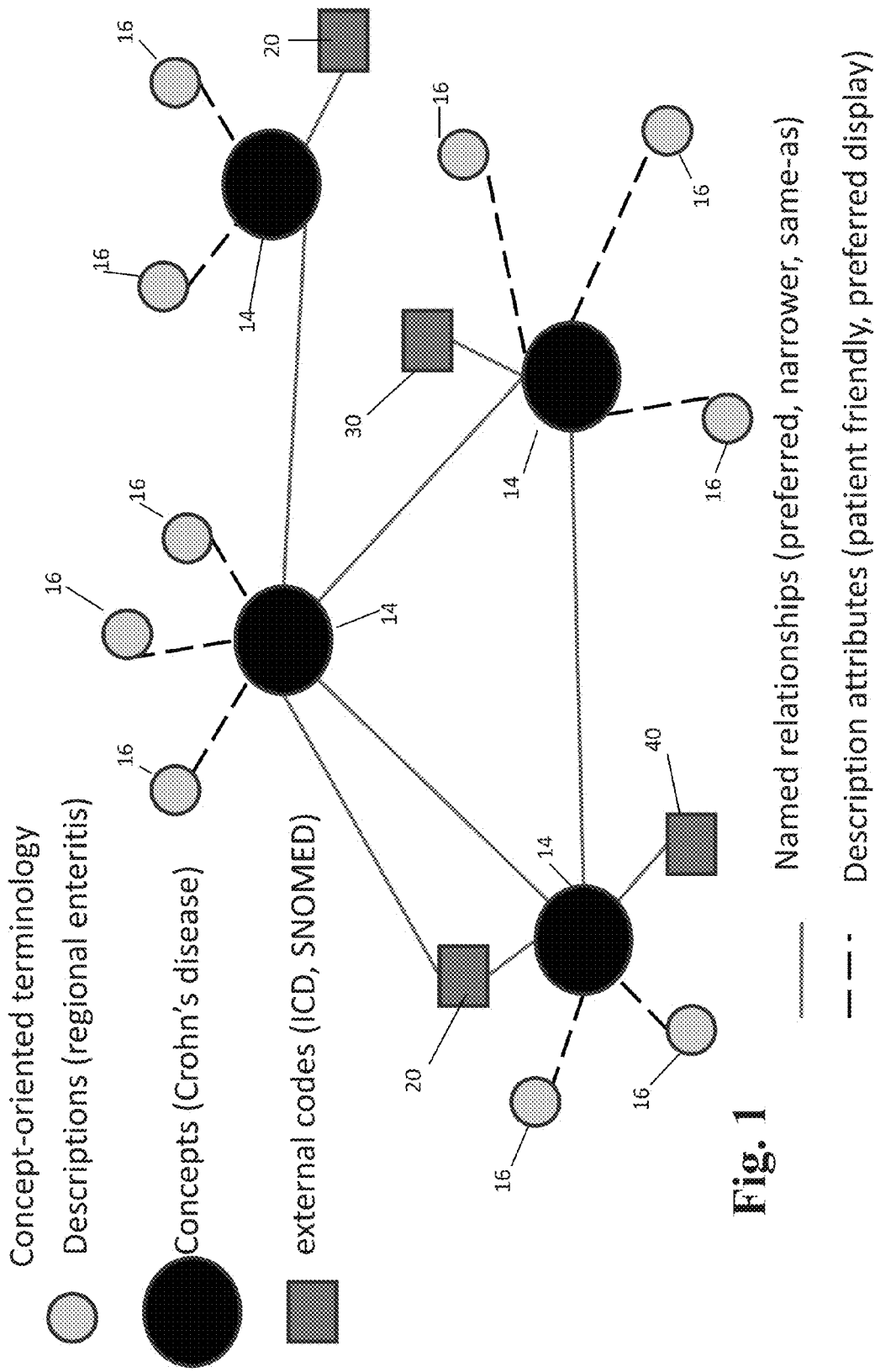
FIG. 1 is a representation illustrating one example of the relationship between concepts and descriptions within an interface terminology and external codes linked to the terminology.

For example, one schema may include domains at a top level. As seen in the depiction of FIG. 1, within each domain, there may be a plurality of concepts 14, which may define clinical findings and may be fully, well-defined expressions of clinical intent. Concepts preferably are unique within each domain, although it may be possible to have the same concept in multiple domains.

Each concept 14 also may be arranged in a one-to-many relationship with one or more descriptions 16. In one embodiment, descriptions may be at a hierarchically lower level than concepts. Preferably, however, descriptions may reside at the same hierarchical level as concepts and may be alternative ways to express a concept. As discussed herein, an alternative name for a description may be a lexical.

Within each domain, data may be managed and ultimately distributed at the description level. In other words, each description may map to one or more codes in each of one or more different code sets. For example, in order to accomplish different tasks, there may be administrative terminologies 20 such as ICD-9-CM, reference terminologies 30 such as SNOMED CT, and clinical terminologies 40. Codes within each set may map to the descriptions in each domain.

Figure 2:
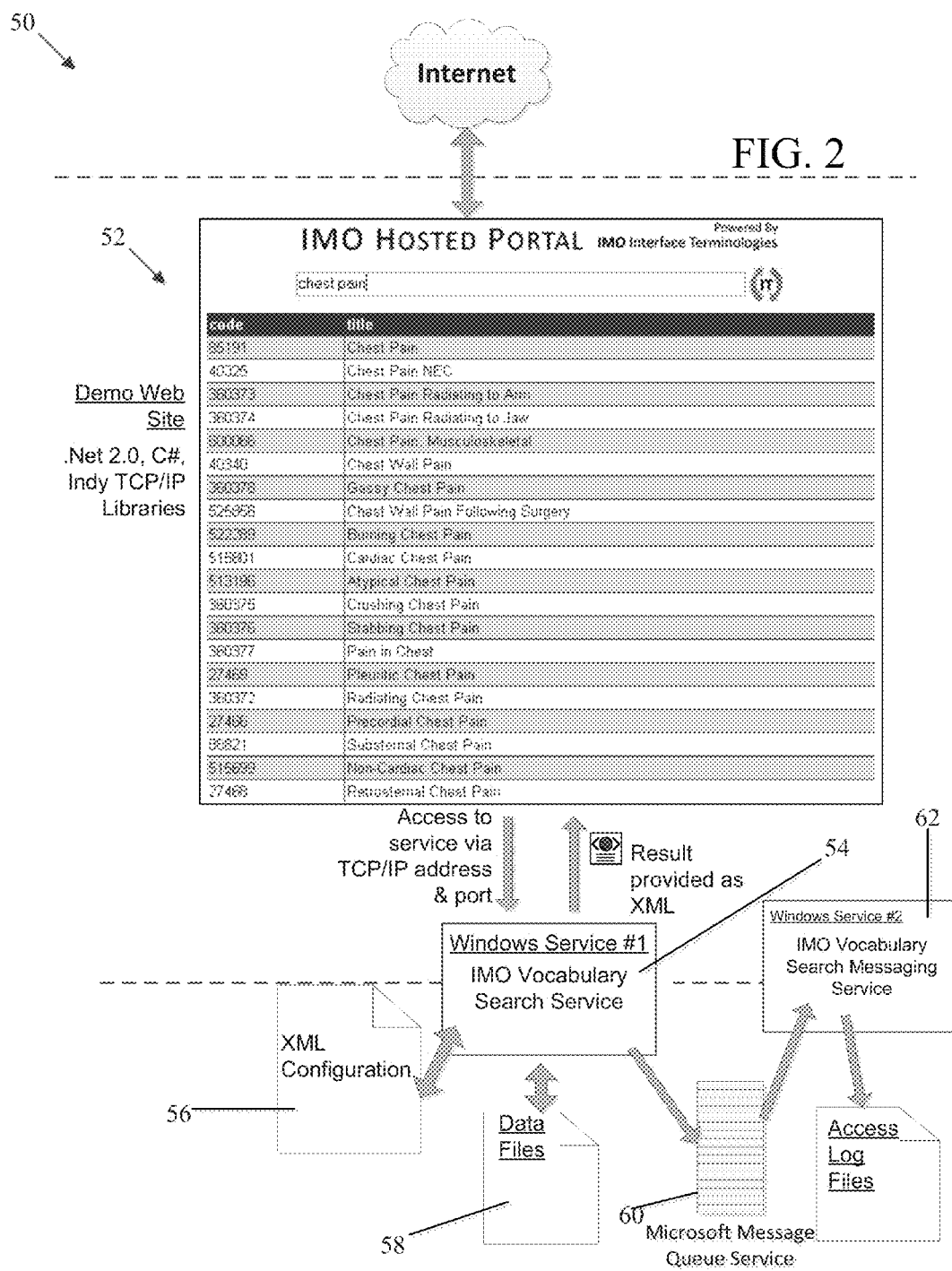
FIG. 2 is a schematic of front and back end elements of the portal described herein.

One example of the system, which may be described as a "Terminology Portal" or as a "Portal," is shown in FIG. 2. Within the Portal, one or more configuration files, such as XML Configuration files, may supplement the locations of the database schema and SQL query strings. As a result, a data stream may be created, configuring the Terminology Portal to function as a search engine.

Different types of searches may be supported by the Portal. For example, the system may support both search and detail requests for one or more data sources.

In one embodiment, given a search string for any lexical data source, the Terminology Portal preferably provides all possible results that may correspond to the search input, preferably returning the absolute best reference result, i.e., the best code or codes from among the various code sets, where the sets being searched may be predetermined or may be selected for inclusion by the user. Conversely, given a search string for any cross map data source, the Terminology Portal preferably provides efficient cross mapping data services. Still further, given a reference code, the Terminology Portal preferably provides detail information about that code, such as mappings, links to documents or other data sources, etc.

An end user may implement system 50 by using an interactive portal 52, which may be displayed to the user as part of a graphical user interface in communication with back end systems via one or more types of connection, e.g., Internet, intranet, LAN, WAN, etc.

Portal 52 may be a hosted solution, in which any environment supporting TCP/IP as one communication mechanism may interface with portal 52.

Portal 52 may include the following additional components:

"Search Service" Windows Service.

A Portal Search Service 54 (in one embodiment, a Terminology Portal search service) in the form of a Windows Service may fulfill two distinct functions: search requests and detail requests. Search requests may comprise the situation where a user searches for and is presented with a result. Conversely, detail requests may commence with the user presenting the system with a query and then returning to the user substantially everything in the system regarding a category of information or a request. For example, in a detail search, the system may return background information surrounding a desired ICD-9-CM code, a listing and/or explanation of other codes related to that code, and links to content related to or tagged with the code.

The service also may include a configuration file 56, such as the file 'Vocabulary Service Configuration.xml,' which may specify one or more data files for use with the system, as well as those data files 58 themselves. One example of this configuration file is as follows:

```
<configuration>
  <!-- Client machine access -->
<!-- IP address -->
<allow ip="127.0.0.1" name="MyServer" mask="255.255.255.255"/>
<!--
<allow ip="[client ip]" name="[client name]" mask="[subnet mask]"/>
-->
<!-- Organization ID -->
<!--
  <allow orgid="[key]" name="[client name]"/>
  -->
  <!-- SMTP -->
```

```
        <!--
        <SMTP host="[SMTP host]" port="[SMTP port]" Username=
    "" Password="" />
        -->
        <!-- Queue polling wait time (s) -->
        <queue wait="10" />
        <!-- Administrator emails -->
        <!--
        <Email>AdminUser@customermail.com</Email>
        <Email>AdminUser2@customermail.com</Email>
        -->
        <!-- ProblemIT -->
        <lexicon name="Lexical Stream Example">
            <!-- Search Configuration Parameters -->
        <!--
            <SearchConfigParameters>
                <ExecDYM>0</ExecDYM>
                <ExecAND>1</ExecAND>
                <ExecOR>0</ExecOR>
                <ExecTopDYM>0</ExecTopDYM>
            </SearchConfigParameters>
        -->
            <file name="Example.LexicalStream.cit.imo" />
            <host ip="127.0.0.1" port="1967" />
            <queue name=".\private$\IMO Hosted Terminology Portal" />
        </lexicon>
        <!-- Medical Necessity -->
        <crossmap name="CrossMap Stream Example">
            <file name="Example.CrossMapStream.cit.imo" />
            <host ip="127.0.0.1" port="1980" />
            <queue name=".\private$\IMO Hosted Terminology Portal" />
        </crossmap>
</configuration>
```

As will be appreciated, one or more portions of the configuration file may be activated or otherwise modified depending upon the purpose for which that section of code is needed.

Administrative actions affecting search service 54 and search requests may be queued to a Microsoft Windows Messaging queue service 60.

"Vocabulary Search Messaging Service'" Windows Service.

A second Windows service for use with the system may include Terminology Portal Search Messaging Service 62, which is the service for monitoring the Terminology Portal Search Service, and logging communications carried to the Terminology Portal search service by third party applications.

While the Terminology Portal Search Service 54 may be geared toward the absolute shortest response time that can be achieved for each search request, the Terminology Portal Search Messaging Service 62 may carry out tasks that may be achieved on a time deferred mode, such as gathering past search service requests and logging such requests in a log file.

Similar to the Terminology Portal Search Service, the Terminology Portal Search Messaging Service may require communication with an XML configuration file to function properly. In one embodiment, the configuration file may be the same 'Vocabulary Service Configuration.xml' 56 as the XML configuration file, although it may be modified to serve the specific needs of Terminology Portal Search Messaging Service 62.

Microsoft Messaging Queuing Services

This service 60 may be used to enable time-deferred services rendered by the Terminology Portal Search Messaging Service 62. In one aspect, queuing services 60 may be an in memory service.

As stated above, the Terminology Search Service may be configured to provide responses to user requests as quickly as possible. This may be achieved by reducing or eliminating disk or file-based I/O operations for the search service and pushing them to the Search Messaging Service. The Search Messaging Service may be configured to wake up periodically to receive and process those requests. In order to free up system resources, requests may be pushed from Search Service 54 to Queuing Services 60, with Search Messaging Service 62 retrieving them from the queue whenever Search Messaging Service 62 wakes up.

In a 64-bit implementation, Queuing Service 60 may enable Search Messaging Service 62 to wake up less frequently, because the queue is larger than in a 32 bit implementation. A 32-bit queuing service may permit a queue with just over 65 k entries. In comparison, for the purposes used herein, a 64-bit queuing service queue may permit a virtually unlimited number of entries. Thus, Search Messaging Service 62 may need to call Queuing Services 60 less often, thereby performing fewer I/O calls and performing those calls when fewer system resources are being consumed.

Lexical Data Sources

Data files 58 may include lexical data sources and other data that may be tagged or otherwise related to the lexical data. Lexical data sources may include list driven data sources, i.e., lists of terms each associated with unique codes.

Cross Map Data Sources

Data files 58 also may include Cross Map data sources, which may include lists of code maps, i.e., maps from one list of code set elements to a second list of code set elements. A good example is IMO Medical Necessity: this data source includes a list of contractors for which there are lists of ICD-9-CM/HCPCS code maps.

Data stream files may be acquired in one or more ways, including by running installations or copying the files. Data Stream files may come in one or more different formats, e.g., as "raw" files or as installation packages. Raw files may be copied into a Terminology Portal folder created by the installation process. If installing Data Stream via installation packages, then the install process may put files in the appropriate location automatically.

Next, each Data Stream product may need to be licensed and activated before it can be used. In other words, the system may be able to access and distribute data created and maintained by third party entities.

Additional System Features

Security by only allowing access to recognized requestors:

The Portal may be configurable to grant access to client machines by authenticating either their IP address or an organization ID (orgid) that is specified when making a search request, as can be seen in the config file example provided above. Granting access by organization ID may be useful in implementations where client machines have a dynamic or changing IP address. Multiple "allow" nodes can be added to cover all accessing machines.

To grant access by IP address, the config file may be modified by:

Un-commenting/adding an <allow ip="[client IP]" name="[client name]" mask="[subnet mask]"/>node.

Setting the '[client IP]' value to the client machine's IP address.

Setting the '[client name]' to a value that identifies the client.

To allow multiple clients within a subnet, set the '[subnet mask]' value to an IP mask that grants access to the appropriate client subnet. For instance, a mask of '255.255.255.0' will grant access to all clients that have IPs with their first 3 segments matching the 'ip' address specified. This is particularly useful in a client-server implementation.

Conversely, to grant by Orgid, the config file may be modified by:

Un-commenting/adding an <allow orgid="[key]" name=" [client name]"/> node.

Setting the 'orgid' with a key. This key will be used by the client machines to authenticate when consuming the service.

Setting the 'name' with the client's name.

Note: The client machines will need to specify the 'orgid' when consuming the service.

Search Function

The search function is the function accepting search criteria and returning a search result expressed as XML or JSON documents. Creating a search request includes the steps of establishing a TCP/IP connection to the Terminology Portal Search Service, sending a search string, and gathering the result. As discussed above, a plurality of data sources, e.g., lexical and cross-map sources, may be searched. In either case, the search steps may be substantially the same, although the content of the search string and result may differ.

In one aspect, the search query may be written in a programming language such as (C++ or other fourth generation languages, instead of C# or Delphi) C# or other language that may be compiled using a 64-bit compiler.

Search Function—Lexical Data Source

A lexical-based search function may receive the user's query and, for one or more given domains, search for exact and approximate matches, returning the lexicals within the domain that most closely correspond to the user's request. For example, the user may enter the phrase "knee pain" and want to search within a "problem" domain. The system will analyze the user's input and may return multiple possible results, including, e.g., "knee pain," "pain in the knee," "pain the knee—right," "pain in the knee—left," etc. These results may be returned as a payload within an XML, JSON, or other acceptable document format.

The search function may be able to go beyond exact matches and perform complex queries in order to serve useful results, such as when the user misspells one or more words or enters a query without an exact lexical match. As discussed below, the system may include one or more "Did you Mean" subroutines in order to evaluate the query and attempt to return one or more results.

This query may involve a ranked algorithm or some other methodology in an attempt to answer the user's query. Using the schema described above in FIG. 1 and with an example shown in FIGS. 3A-3C, one embodiment of such an algorithm may involve first searching the lexical table 220 for a match and then interfacing with word index table 222 and/or custom word index table 224 in the event that no match is found. Entries in both of the latter tables may include flags or other pointers to elements in the base lexical table, whereby a match in one of the lower tables may be related to an element of the base table, such that the user may be presented with the corresponding lexical table entry in response to the query.

Search Function—Cross-Map Data Source

A search request may include specifying a search string, for example a code list 1, and a code list 2, or a text string such as "knee pain". In one embodiment, each code list may correspond to a set of administrative, reference, or clinical code sets. In relation to cross map data sources, the search function may cross-reference code list 1 with code list 2 for a specific data segment and provide the result as an XML or JSON document.

If either of code list 1 or code list 2 is omitted, then the behavior of the portal changes:

If code list 2 is omitted, then, for each item of code list 1, all corresponding code list 2 items are returned.

If code list 1 is omitted, then, for each item of code list 2, all corresponding code list 1 items are returned.

An example search string is 'search^1^48|003.1, 003.20|71010, 71016^myorgid'. The search string format is:

The word 'search'

The separator '^'

The output format, for example '1'. If this value is used, then the format value defined in the configuration file is used. If this value is undefined, or unspecified, then by default XML format is used. For example, a value of "0" may correspond to undefined, "1" may correspond to XML, and "2" may correspond to JSON.

The separator '^'

The segment ID. For medical necessity, this may be the Medicare contractor ID.

The separator '|'

The code list 1: a comma separated list of codes. For medical necessity, codes may be ICD-9-CM codes.

The separator '|'

The code list 2: a comma separated list of codes. For medical necessity, codes may be HCPCS codes.

Optionally, the Organization ID:

The separator '^'

A string identifying the entity accessing the portal services.

Other options may be available to customize the user search, such as the implementation of one or more flags on the search query. For example:

ExecDYM

This flag enables(1) or disables(0) 'Did you Mean' processing of search queries for when no direct matches are found. The default stream value is 1.

ExecAND

This flag enables(1) or disables(0) 'AND' processing of search queries. The default stream value is 1.

ExecOR

This flag enables(1) or disables(0) 'OR' processing of search queries. The default stream value is 0.

ExecTopDYM

This flag enables(1) or disables(0) execution of the top DYM result. The default stream value is 1.

It may be possible to implement other terminologies in a similar fashion by utilizing the above templates to add further entries in the configuration. This implementation may be achieved by:

Updating the Lexicon name value to the terminology's name;

Updating the file path & name to match the appropriate Data Stream file;

Updating the IP value to the IP of the machine that is hosting the portal services; and Assigning each portal terminology a unique Port value, with a value preferably above 1024.

In another aspect, the search subroutine may include the steps of a client machine opening communication on a TCP/IP socket, and connecting to an IP address and desired port on a server hosting the Terminology Portal. The request may be transmitted to the server via the port, which then may receive the request, process it, and return a result. In one embodiment, the communication port is agreed upon between the user and the organization providing and hosting the service as a predetermined and dedicated end point of communication. Alternatively, the port may be any communication port selected by the user, provided it does not correspond to or conflict with a communication port reserved for other system activity.

The search results transmitted back to the client machine may be presented as a string or with the first packet of information comprising a string. A predetermined number of bytes, e.g., the first four bytes, may indicate a size of the data packet being transmitted back to the client device so that the client may know when it has received everything. Determining the format of the first four bytes may be defined ahead of time by following Big Endian or Little Endian architecture conventions.

The server hosting the portal may be any computer meeting the minimum system requirements, e.g., it may be the client machine, a machine somewhere on a network, or a machine hosted by the same entity hosts or otherwise provides the data that is returned in response to search requests.

The system also may help portal clients locate the first and next closest Terminology Portal, both locally and globally, even if internet paths may have disappeared or if the first Terminology Portal server is down. In one embodiment, this functionality may be achieved by employing a GeoDNS patch solution 118, although this may not be the only way to achieve such functionality.

As shown herein, configuration settings may drive the behavior of the terminology portal. In particular, the primary configurable settings may include: IP address, communication port identity, the strings being hosted, and the name of the queue that is needed for talking between search and messaging services. As discussed above, other configuration settings may relate to setting security and access privileges to a client.

It also may be possible to update an IP value registered with the system to set it to the IP of the machine that is hosting the portal service(s), according to the following steps:

A. Host Port:

Default values may be used, but if adding multiple product blocks the Port value must be unique. As a general rule, select a port number between 1025 and 65535. Also be careful that the port assigned is not being leveraged by other services that may be running on the server. For example, do not use port 80 as that is generally leveraged by IIS as the default web port.

B. Queue:

A Microsoft Queue may be set by default to exchange information between different Portal services.

C. Allow:

To grant access to additional client machines, specify either an <allow ip="[client IP]" name="[client name]" mask="[subnet mask]"/> or an <allow orgid="[key]" name="[client name]"/>. Multiple "allow" nodes can be added to cover all accessing machines.

Detail Function

The search function may provide a result dataset, e.g., an XML or JSON dataset, with minimum required information by result item. The detail function may supplement the search function by providing detail information for a single search item identified using the search item unique code.

Creating a detail request again may include the steps of establishing a TCP/IP connection to the Terminology Portal Search Service, sending a detail request string including the search item unique code, and gathering the result.

Detail calls may be similar to Search calls, as described above, although it is possible to return several different payloads, so the system also may return a payload index. As compared to a search call, a detail call may return a larger payload of details, e.g., XML details, related to the topic being searched.

Figure 3A:
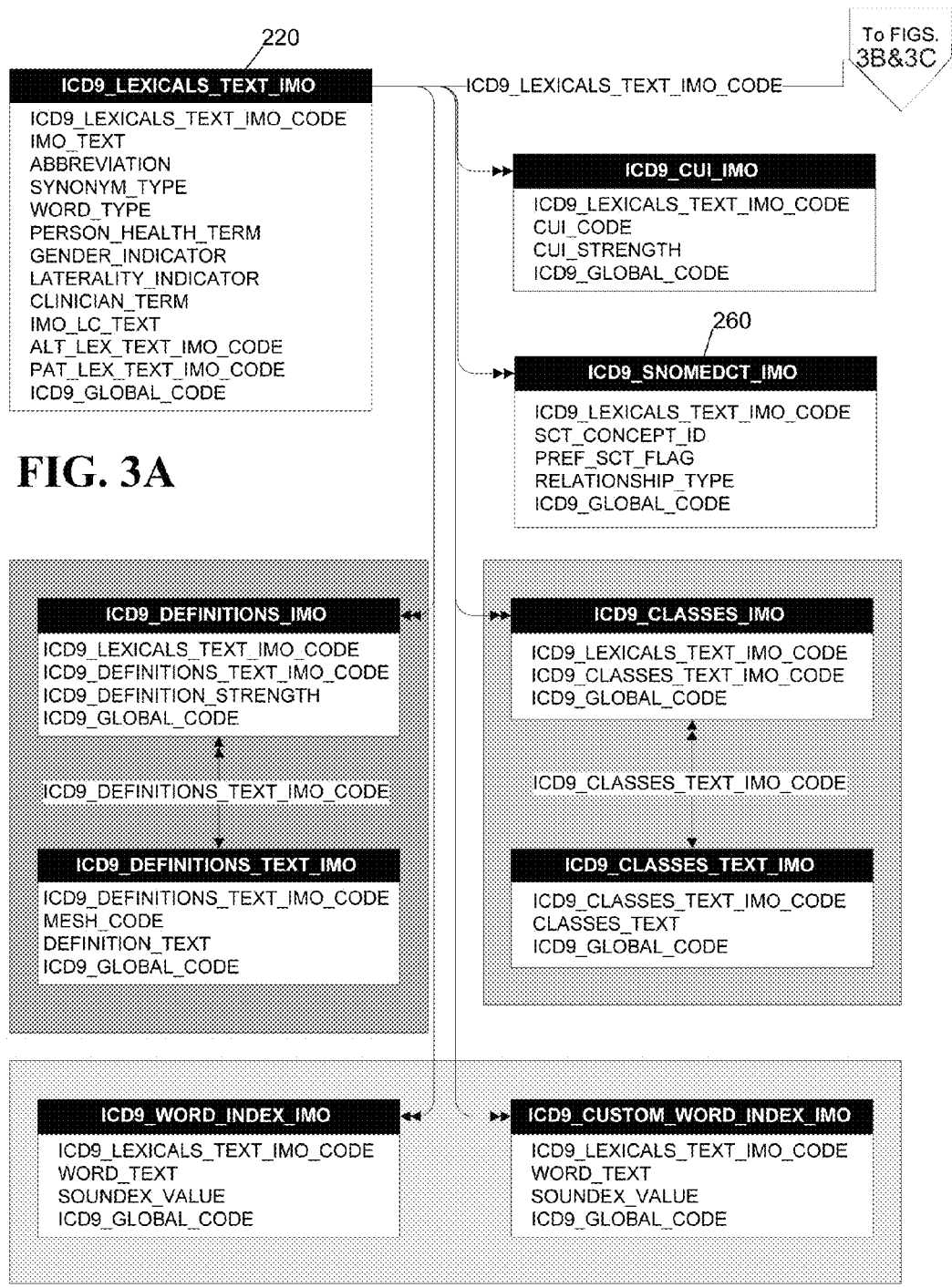
Figure 3B:
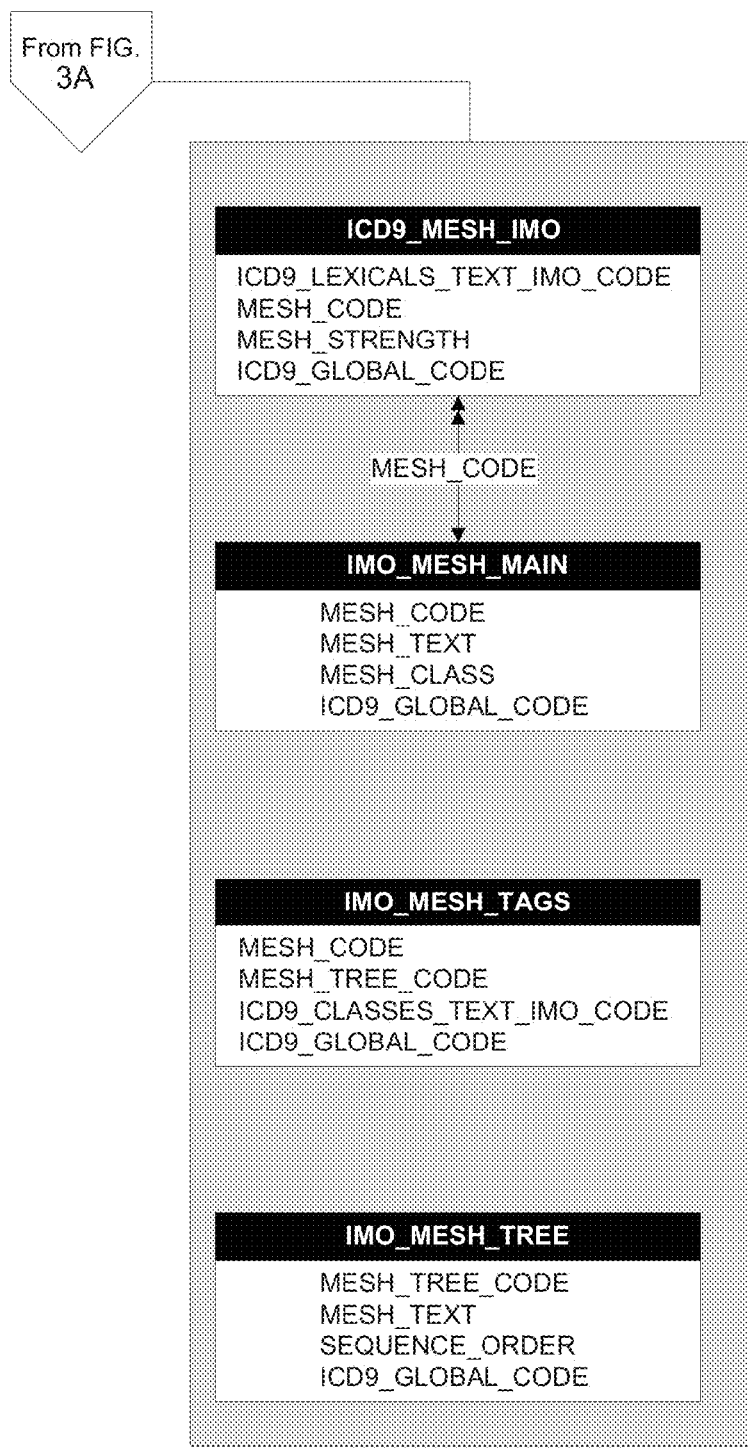

Using the relationship diagram of FIGS. 3A-3C, in one example, a detail search may return the map between the ICD_lexicals_text table 220 (FIG. 3A) to the many options in the ICD9_SNOMEDCT_IMO table 260 (FIG. 3A) or to the many options in the ICD9_IMO table 230 (FIG. 3C) (with a flag to indicate which is preferred). Detail results may vary domain-by-domain, such that the content is different, but the concept behind returning results is the same.

Count Function

The count function is the function accepting search criteria and returning a search result item count as an XML document. Creating a count request may include the steps of establishing a TCP/IP connection to the IMO Terminology Portal Search Service, sending a search string, and gathering the result.

Item Function

The item function is used to query for the search payload, given a set of lexical codes. In one aspect, the function may accept a comma-separated list of lexical codes and return the search payload for the given set, expressed as XML item nodes. Creating an item request may include the steps of establishing a TCP/IP connection to the Terminology Portal Search Service, sending a set of comma-separated lexical codes, gathering the result, and encapsulating the results within root node tags.

Info Function

The Info function call provides useful information about a given hosted data stream including data source and version, expiration dates, search payload fields, etc. In one embodiment, the data may be returned as XML Creating an Info request may include the steps of establishing a TCP/IP connection to the Terminology Portal Search Service, sending an Info request, and gathering the result.

Output Format

In addition to the content of search or detail output files, as discussed above, a search or detail output file preferably is in a format such that its contents can be read and formatted for display to the user. In one aspect, output can be, e.g., in an XML or JSON format. In each case, a resulting document may include:

Header information identifying the data used to compute the result;

Result items, which may be one item for each code, identifying cross maps, with original document references, and possibly with a pass/fail/unknown status; and A global result pass/fail status indicating the medical necessity status check.

In another aspect, the output file may be another format that displays relevant information to the user. For example, a detail request may capture multiple journal articles or images whose contents are mapped to the searched lexical. Instead of text files, these articles or images may be in a binary file format, an html format, etc. Alternatively, the output file may be in a text file format such as XML or JSON but may encode the binary, html, or other document types.

By default, portal output is in XML format. This format can be set to be either XML or JSON by adding the output attribute to the allow block, as follows:

Output="XML"

Output="JSON"

The Portal may be configurable to process search request in different ways. By default, configuration parameters may be specified in the data stream. It may be possible to override these parameters, e.g., by un-commenting the Search Configuration Parameters section and changing the parameter values.

One or both of search and detail requests may be stateless, i.e., one request may not affect or need a next request, and a next request may not be a function of the previous request.

Such design may permit very high scalability, as consecutive requests from a user may be transmitted to completely different servers, where either server may be able to complete the search, with the result that response time may not change significantly.

Regardless of the type of query that is performed, serving the data may present unique challenges, particularly in the field of medical informatics. These challenges may be in the form of searchability and scalability, which may differ from typical Internet searches. In these searches, factors such as the order of words, the number of words, the length of the search, etc., may matter in determining what results to serve.

Once the data repository has been created, additional challenges may arise in connection with the maintenance of an accurate, up-to-date repository. Maintenance may be complicated by the scale of the system, i.e., the amount of data being served, by the continual addition or revision of relevant content, and by the need to maintain up-to-date mappings.

Factors that may be considered in designing the system may include scalability, speed, and accuracy of search results. Other things being equal, these factors may compete with one another, e.g., faster results may be obtained at the expense of some accuracy, or scalability may be achieved by sacrificing a bit of speed.

One of the problems faced when attempting to scale the system is the cumulative effect of I/O operations. Traditional data storage and retrieval systems may rely upon the use of a database to store the required information. That database may be called each time the system receives a query, whereby increasing the number of queries increases the number of calls, thereby increasing the response time necessary to send a query to the database, return a result, page the result into and out of memory, and then access that memory to retrieve the result.

Figure 4:
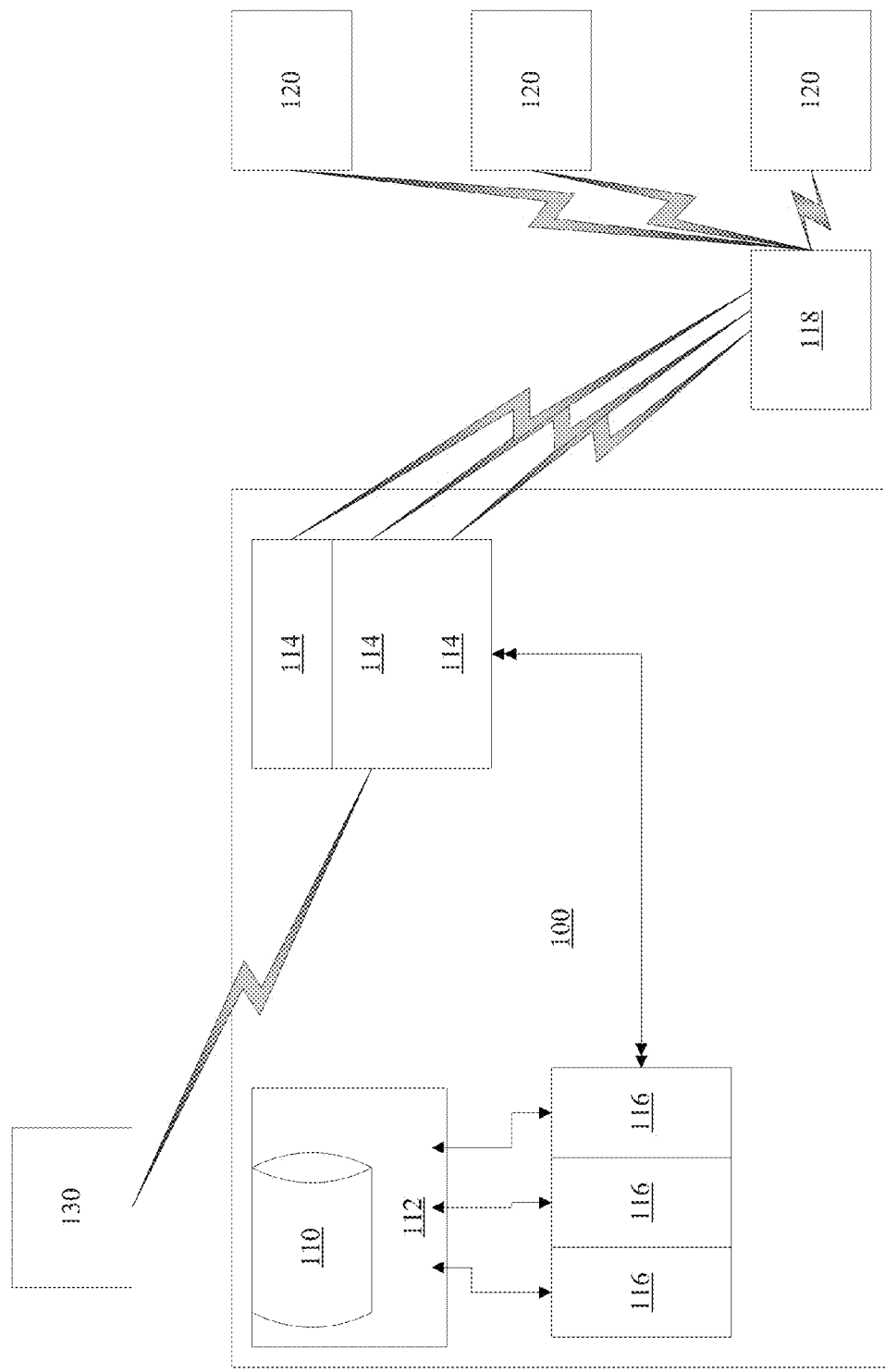
FIG. 4 is a mockup of several exemplary system components in communication with end user machines and data source machines.

In order to overcome this scalability issue and tremendously speed up the service, in one embodiment, the system may rely upon the server 100 including an in memory database 110 within memory 112 to load the necessary data, as seen in the exemplary system mockup of FIG. 4. Loading data in this manner onto the system's Random Access Memory (RAM) may be considerably more efficient, significantly reducing disk I/O operations needed for each query to be processed, thereby reducing the time needed to complete the request.

Another manner in which the current system may achieve greater scalability without sacrificing speed is to create a connection between the search service and the hosted portal that uses raw TCP/IP communication sockets 114. Queries communicated in this matter may be accomplished in the span of a few microseconds to a few milliseconds. While response time may decrease linearly considering increased system load, throughput decrease is linear and incrementally gradual, such that the decrease in response time may not be significant—particularly as compared to the response time increase achieved by in memory implementation for reduced disk I/O and/or the use of server-to-client communication.

The system also may implement a plurality of CPUs 116 per socket in order to increase processing ability. Each CPU accesses memory 112, and the amount of memory that can be accessed may be a function of the mode of the CPU. Previous search portals may have relied upon 32-bit CPUs, i.e., the CPUs had registers 32 bits wide. Each of these CPUs could access 2^32 bits, or about 4 Gb of memory. As described here, the current search portal may implement one or more 64-bit CPUs, which have 64 bit wide registers, and as a result can access 2^64, or 18,446,744,073,709,551,616 bytes about 16 exabytes of memory, or more than 4 billion times more memory.

Whereas a 32-bit portal service may have permitted about 300 people to access the same machine and return results in under 1 second, a 64-bit implementation may achieve these results for about 800 simultaneous people on a single server. Perhaps more significantly, the 64-bit implementation may permit the serving of substantially more and different types of data in response to search queries, because the extra memory accessible by each CPU can be used to serve and distribute additional, larger data files.

A 64-bit portal implementation also may simplify serving multiple terminology domains to end users. For example, a medical informatics system may rely upon several dozen different terminology domains, many of which are interdependent. Earlier portal implementations may permit hosting and serving about 5-6 of those domains on a single server, thereby requiring multiple servers to accommodate all of the domains. In that case, the system is required to know and keep track of the location of each domain to ensure that a full, accurate search is performed. The 64-bit portal as described herein, however, may be able accommodate all domains on a single server.

Details of the domain locations may be stored and accessed, e.g., in the configuration file. Since all domains may be servable on a single server, the configuration file, therefore may be simpler and less prone to errors, thereby reducing the amount of oversight or maintenance necessary.

The shortcomings of earlier systems may be compounded if attempts are made to serve additional documents, in addition to the terminology mapping results, due to the additional memory required to serve those documents. In that case, instead of about 5-6 domains per server, it may be that only 3-4 domains may be served, since the remaining memory may be dedicated to the additional documents. Alternatively, the documents or links to documents may be served on a separate server from the domains, thereby requiring even further recordkeeping and maintenance to ensure that the proper documents and terminology mappings are served in response to the user's request. In contrast, a 64-bit portal implementation may be able to serve all the necessary data on fewer servers, preferably on a single server. Additional servers may be employed, although those servers may be used for redundancy or to maintain acceptable performance results in response to system scalability.

Hardware Requirements

As stated above, the Portal can be served on one or more of multiple machine types, including the end user's machine, a local server 100 in communication both with the end user computers 120 and with the data provider machines 130, or a remote server in ultimate communication with the end user's machine and serving as a provider of at least some of the data.

A machine having the following configuration may be used to serve the portal. The following generally may be minimum specifications for the server, although minor variations may be permitted.

64-bit server class computer, with 2 Gigahertz or higher processor clock speed recommended, a one or many processor system. The machine also may include a 64-bit compiler, such as a C++ compiler or another fourth generation language compiler.

1 gigabyte (GB) of RAM or higher recommended.

10 gigabytes (GB) of available hard disk space.

Internet/Intranet access.

Microsoft Windows 2008 R2 Server operating system.

A queuing service, such as The Microsoft Message Queuing service

As discussed above, the Portal may be configurable to grant access to client machines by authenticating either their IP address or an organization ID (orgid) that is specified when making search request. Granting access by organization ID may be useful in implementations where client machines may have a dynamic or changing IP address. Multiple "allow" nodes can be added to cover all accessing machines.

While the foregoing written description enables one of ordinary skill to make and use the same, those of ordinary skill also will understand and appreciate the existence of variations, combinations, and equivalents of the specific exemplary embodiments and methods disclosed herein. The claims should therefore not be limited by the above described embodiment and method but should be interpreted within the scope and spirit of the invention as claimed.

What is claimed is:

1. A method for searching and presenting data, comprising:
   receiving a search query at a computer having a processor;
   comparing, by the processor, the query against one or more data repositories for data related to the query, wherein the comparing step includes analyzing the query for an exact or approximate match to one or more entries in a code set; and
   serving one or more exact or approximate matches to a user;
   wherein the code set is stored in a database;
   wherein the code set includes at least one domain, a plurality of concepts within the at least one domain, and a plurality of descriptions also within the at least one domain;
   wherein a description is an alternative way to express a concept; and
   wherein the processor is a 64 bit processor.

2. The method for searching and presenting data of claim 1, wherein the receiving and serving steps are implemented using a raw TCP/IP socket on the computer.

3. The method for search and presenting data of claim 1, where the database is an in memory database.

4. The method for searching and presenting data of claim 3, wherein the in memory database also stores a set of mappings between the code set and another code set.

5. The method for searching and presenting data of claim 4, the method further comprising: serving, to the user, mappings corresponding to the one or more or exact or approximate matches.

6. The method for searching and presenting data of claim 1, further comprising:
   storing additional data;
   tagging the data with one or more codes in the code set;
   identifying data tagged with the one or more exact or approximate matches; and
   serving at least some of the identified data to the user.

7. The method for searching and presenting data of claim 1, wherein the serving step includes serving descriptions corresponding to the one or more exact or approximate matches.

8. The method for searching and presenting data of claim 1, wherein the database also stores a set of mappings between the code set and another code set; and
   wherein mappings are made between concepts in the code set and entries in the other code set.

9. The method for searching and presenting data of claim 1, further comprising:
   pushing time deferred tasks to a queuing service;
   wherein the comparing step is performed by a search service, and
   wherein the time deferred tasks are not performed by the search service.

10. The method for searching and presenting data of claim 9, further comprising:
    receiving and processing, by a messaging service, the time deferred tasks from the queuing service.

11. A system for searching and presenting data, comprising;
    a server having one or more processors, wherein each processor has a 64-bit wide register;
    one or more communication connectivity means on the server configured to receive search queries and serve search results;
    a database storing a code set; and
    a search service configured to analyze the search queries, compare the search queries against the code set, and serve exact or approximate matches to machines that originated the search queries;
    wherein the code set includes at least one domain, a plurality of concepts within the at least one domain, and a plurality of descriptions also within the at least one domain,
    wherein a description is an alternative way to express a concept.

12. The system for searching and presenting data of claim 11, wherein the database is an in memory database.

13. The system for searching and presenting data of claim 11, wherein the communication connectivity means are TCP/IP sockets or WCF connections.

14. The system for searching and presenting data of claim 11, wherein the search service is configured to serve results in a machine-readable file format.

15. The system for searching and presenting data of claim 14, wherein the file format is XML or JSON.

16. The system for searching and presenting data of claim 11, wherein the database also is configured to store mappings between the code set and another code set.

17. The system for searching and presenting data of claim 16,
    wherein mappings are made between concepts in the code set and entries in the other code set.

18. The system for searching and presenting data of claim 11,
    wherein the database is configured to store additional data, the additional data tagged with one or more codes in the code set;
    wherein the system is configured, in response to a search request, to identify data tagged with the one or more exact or approximate matches and to serve at least some of the identified data to the user.

19. The system for searching and presenting data of claim 11, further comprising:
    a plurality of servers configured to receive search queries and return search results,
    wherein the system is configured to direct a user's query to the server closest geographically to the user's computer and to redirect the query to another server if that server has insufficient resources to fulfill the query promptly.

20. The system for searching and presenting data of claim 11, further comprising:
    a queuing service; and
    a messaging service;
    wherein the system is configured to push time deferred tasks to the queuing service;
    wherein the messaging service configured to receive the time deferred tasks from the queuing service and to processing the time deferred tasks; and wherein the search service is configured to not process the time deferred tasks.

21. A method for searching and presenting data, comprising:
receiving a search query at a computer having a processor;
comparing, by the processor, the query against one or more data repositories for data related to the query, wherein the comparing step includes analyzing the query for an exact or approximate match to one or more entries in a code set;
serving one or more exact or approximate matches to a user;
storing additional data;
tagging the data with one or more codes in the code set;
identifying data tagged with the one or more exact or approximate matches; and
serving at least some of the identified data to the user;
wherein the code set is stored in a database; and
wherein the processor is a 64 bit processor.

22. A system for searching and presenting data, comprising;
a server having one or more processors, wherein each processor has a 64-bit wide register;
one or more communication connectivity means on the server configured to receive search queries and serve search results;
a database storing a code set; and
a search service configured to analyze the search queries, compare the search queries against the code set, and serve exact or approximate matches to machines that originated the search queries; wherein the database is configured to store additional data, the additional data tagged with one or more codes in the code set;
wherein the system is configured, in response to a search request, to identify data tagged with the one or more exact or approximate matches and to serve at least some of the identified data to the user.

* * * * *